C. O. JONSSON.
ANGLE SHAFT COUPLING.
APPLICATION FILED MAY 29, 1911.
1,119,514.
Patented Dec. 1, 1914.
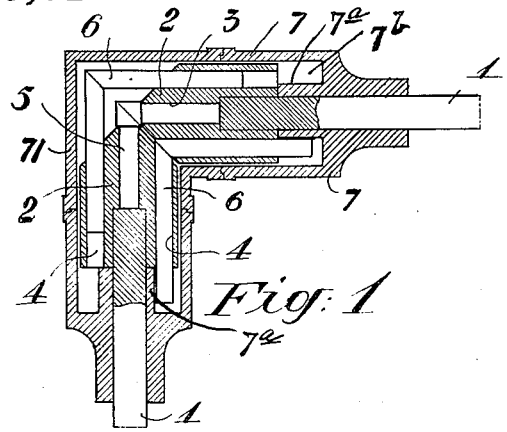
Fig. 1
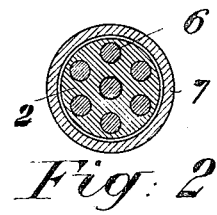
Fig. 2
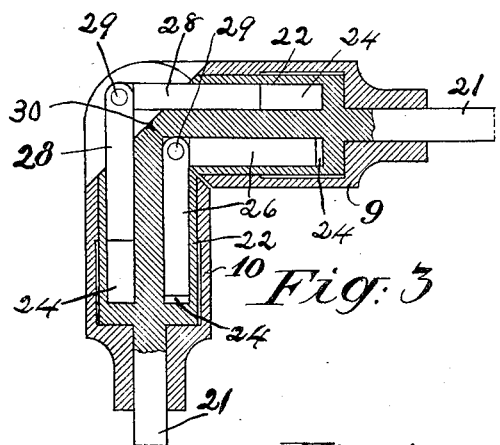
Fig. 3
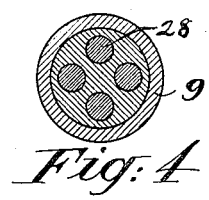
Fig. 4
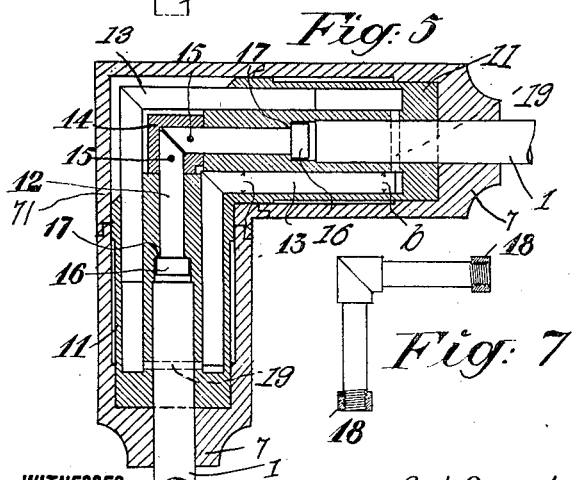
Fig. 5
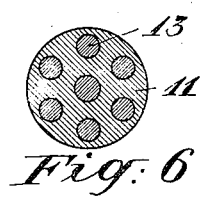
Fig. 6
Fig. 7
WITNESSES:
Carl Oscar Jonsson, INVENTOR
BY
ATTORNEY.

UNITED STATES PATENT OFFICE.

CARL OSCAR JONSSON, OF HVETLANDA, SWEDEN.

ANGLE-SHAFT COUPLING.

1,119,514.     Specification of Letters Patent.     Patented Dec. 1, 1914.

Application filed May 29, 1911. Serial No. 630,207.

*To all whom it may concern:*

Be it known that I, CARL OSCAR JONSSON, of Hvetlanda, Sweden, have invented certain Improvements in Angle-Shaft Couplings, of which the following is a specification.

The present invention relates to that type of coupling for two shafts whose axes intersect at an angle, in which a plurality of angular rods or pins are employed, the ends of which slide in holes in the ends of the shafts, or in members mounted on those ends, in directions parallel to the axes; and it has for its object to provide an improved form of this type of coupling, which shall give increased rigidity and mutual support to the adjacent shaft-ends, as well as to provide means of lubrication.

My improvements consist in the constructions and combinations hereinafter described and pointed out in my claims.

For the better understanding of my invention, I have illustrated the same in the accompanying drawings, wherein—

Figures 1 and 2 are respectively a longitudinal and a transverse section through one embodiment of my improved coupling. Figs. 3 and 4 are similar views of another embodiment thereof; Figs. 5 and 6 are similar views of a third embodiment thereof; and Fig. 7 is a detail-view showing a modified form of the central pin-support of Fig. 5.

In these drawings every reference letter refers to the same part wherever used.

Taking the first form, illustrated in Figs. 1 and 2, the two shafts whose axes intersect at an angle, (here illustrated for convenience as a right-angle) are designated 1, each shaft having mounted on its ends a cylindrical head 2, the two heads having preferably conical faces as shown where they come together, and said heads being respectively bored from their distant ends to receive the ends of the shafts 1 and provided at their adjacent ends with smaller axial bores 3, which receive the two legs of an angular pin 5. This pin serves as a journal for the two shaft-ends to hold them rigidly in intersecting relation and the two heads turn thereon. Said heads 2 have further a number of marginal bores 4, preferably slightly tapered toward their distant ends, said bores being parallel to the axes of rotation; and a plurality of two-legged angular pins 6 are provided, the two legs of each of which fit the one leg in one of the bores 4 in one head and the other leg in a bore 4 in the other head; whereby as the shafts and heads 2 rotate they carry with them the pins 6, which slide in and out of the bores 4, and one shaft may be driven from the other. The legs of the angular pins 6 are also preferably slightly tapered to correspond with the taper of the bores 4. Furthermore, to support the ends of the shaft 1 and form suitable bearings for the same, I provide the bearing-boxes 7, which are formed with cylindrical tubular lugs 7ª and tubular extensions, as shown, adapted to inclose a portion of the heads 2, and an angular hollow casing 71 is disposed to connect the two tubular ends of the respective boxes 7 and thereby completely inclose the working parts, thus enabling said casing to be filled with oil and providing thorough and constant lubrication.

Describing now the form of my invention illustrated in Figs. 3 and 4, I have shown the shafts 21, each provided with a head 22 formed thereon, as it is immaterial to my invention whether the head is formed integrally with the shaft or made separately therefrom as shown in Fig. 1. The heads 22 are provided with a plurality of cylindrical bores 24, which are parallel to and surround the axes of rotation and, in each pair of these bores, one in each of the shafts, engage the legs of one of a number of angular pins 26. This form of the invention is made for a varying angle between the two shafts, and therefore each of the angular pins 26 is formed of two separate members 28, pivotally united by pins 29. In this case also, in place of the bearings 7 and casing 71 of Fig. 1, I prefer to provide a pair of combined journal and casing members 9 and 10, which are pivoted together at the point 30 on a hinge-line passing through the point of intersection of the two shafts.

In Fig. 5 I have illustrated a more elaborate form of the invention than shown in Fig. 1, being provided with better and more satisfactory means for holding the shaft ends in rigid relation one to the other. Upon the ends of the shafts 1 are placed the cylindrical heads 11. The adjacent ends are made in the form of truncated cones as before, and the space between the truncated faces of the cones leaves room for a block 14, which is perforated by two bores at right-angles to receive the ends of two pins 12, which are secured to said block by transverse keys 15. The heads 11 have their conical ends perforated as in Fig. 1 by cylindrical axial bores to receive the two pins 12 and between these bores and the ends of the shafts 1 are formed shouldered recesses 17 in which are received heads 16 which are formed on the ends of the pins 12.

In assembling the apparatus, the pins 12 are put in place in the heads 11 from the shaft-ends, so that their adjacent ends project from the truncated conical faces of the heads, and these ends are now secured in place in the block 14 by means of the keys 15, the angular transmission-pins 13 having first been inserted in their respective bores. The apparatus thus assembled is then placed on the ends of the shafts 1, and keyed thereto. The flanged bearing-boxes 7 and hollow casing 71 may be used as shown here, the same as in Fig. 1.

Instead of forming the members 12 separately with integral heads 16 and a separate block 14, the two legged angle-pin 12' as shown in Fig. 7 may be used, the two legs being united by a central head 14'. The ends of the pin 12' may be threaded to receive nuts 18, which take the place of the solid heads 16 of Fig. 5. It will be seen that this accomplishes substantially the same purpose as the structure of Fig. 5.

In the preferred forms of my invention, I provide special means of lubrication in the form of a connecting passage between the inner ends of the bores in the rotary elements in which the two-legged pins reciprocate. Such connecting passage is provided by the annular chamber 7$^b$ in the casing 7 of Fig. 1 because in this case the bores 4 open into said chamber, and by the annular groove 19 in the member 11, which groove surrounds the shaft and connects the bores for the pins 13.

I wish it understood, however, that my invention is not limited by the concrete examples illustrated in the drawing, but is subject to various modifications and changes within the scope of the appended claims.

Having thus described my invention, what I claim as new and desire to secure by Letters Patent is:

1. The combination of two rotary elements adapted to rotate about axes intersecting at an angle, each of said rotary elements having an axial bore extending from the intersecting end and said axial bore having at its base a recess forming a shoulder with the end of said bore, an element having two cylindrical legs bearing an angle to each other equal to that between the two axes of rotation and each leg having on its free end an enlarged head provided with a thrust-shoulder, the respective legs engaging in the respective bores and the respective heads bearing against the shoulders at the ends of said bores, whereby to take end-thrust; in conjunction with a plurality of two legged angular pins, said heads having further a plurality of lateral bores parallel to the axes in which the respective legs of said last-named pins engage.

2. The combination of a pair of rotary elements adapted to rotate about axes intersecting at an angle, each of said elements having a central bore at its end adjacent to the other and at the opposite end a larger bore adapted to receive a shaft and having further a plurality of lateral bores parallel to and surrounding the central bores, a plurality of two-legged angular pins the two legs of which make with each other the same angle as the two rotating axes and slide in the respective lateral bores of the two rotary elements, said elements having their adjacent ends faced off at right-angles to their respective axes of rotation, an apical member having a pair of end-thrust bearing faces against which the end-faces of said rotary elements are adapted to bear and having further a pair of bores at right-angles to said faces and coaxial with the shaft axes, and a pair of cylindrical pins confined in said first-named central bores of the respective rotary elements and having each an enlarged head bearing endwise against shoulders formed at the base of said bores, the opposite adjacent ends of said pins passing into and being secured in the respective bores of said apical member.

3. An angle-shaft-coupling comprising a pair of rotary elements in independently adjustable position adapted to rotate about axes intersecting at an angle, said rotary elements having axial bores therein, a central two-legged rod which does not take part in the revolution of said rotary elements and the two legs whereof pass through said bores and are provided with means for engaging them with said rotary elements and preventing the latter from moving in a longitudinal direction; said rotary elements having also a plurality of bores parallel to their axes and surrounding the central bore, and a plurality of two-legged pins the legs whereof slide in the last-named bores of said rotary elements.

4. The combination of two rotary elements adapted to rotate about intersecting axes, said elements having each an axial bore extending from the intersecting end, an angular pin having two legs bearing to each other the same angle as that of the two axes of the rotary elements and engaging in the respective axial bores thereof, and a plurality of angular pins having each a pair of legs at the same angle to each other as the axes of rotation of said rotary members; said rotating members having each a plurality of lateral bores parallel to their axes in which the ends of said pins engage.

5. The combination of a pair of rotary elements adapted to rotate about intersecting axes, each of said elements having a plurality of lateral bores parallel to and surrounding its axes of rotation, a plurality of two-legged angular pins, the two legs of which make with each other the same angle as the two intersecting axes of said rotary elements and slide in the respective lateral bores of the two elements; and an angular casing entirely inclosing all of the hereinabove-named parts so as to serve as a lubricant receiver, said casing having also a thrust face on each end against which the ends of the respective rotary members distant from their points of intersection bear; said casing consisting of two similar end pieces and an angle-shaped intermediate piece, which is connected to the end pieces by means of flanges, said casing having further bearings adapted to receive shaft ends co-axial with said intersecting axes, and said rotary elements being formed to receive and make non-rotatable connection with such shaft-ends; whereby the entire device is made independent of the shafts therefor and adapted to be connected with the same without dismounting.

In testimony that I claim the foregoing as my invention, I have signed my name in presence of two subscribing witnesses.

CARL OSCAR JONSSON.

Witnesses:
   K. LINDSROTHS,
   S. CULT.